(12) United States Patent
Kerr

(10) Patent No.: US 12,709,383 B2
(45) Date of Patent: Aug. 18, 2026

(54) LANDING GEAR SYSTEMS AND METHODS OF TESTING

(71) Applicant: AIRBUS OPERATIONS LIMITED, Bristol (GB)

(72) Inventor: Sean Kerr, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 294 days.

(21) Appl. No.: 18/520,151

(22) Filed: Nov. 27, 2023

(65) Prior Publication Data

US 2024/0199201 A1 Jun. 20, 2024

(30) Foreign Application Priority Data

Dec. 19, 2022 (GB) ..................................... 2219149

(51) Int. Cl.
*B64C 25/28* (2006.01)
*B64C 25/10* (2006.01)
*B64C 25/22* (2006.01)
*B64F 5/60* (2017.01)

(52) U.S. Cl.
CPC .............. *B64C 25/28* (2013.01); *B64C 25/10* (2013.01); *B64C 25/22* (2013.01); *B64F 5/60* (2017.01)

(58) Field of Classification Search
CPC ......... B64C 25/28; B64C 25/10; B64C 25/22; B64C 25/24; B64C 25/26; B64C 25/30; B64F 5/60; B64D 45/0005
See application file for complete search history.

(56) References Cited

U.S. PATENT DOCUMENTS 4,573,649 A 3/1986 Yourkowski
9,334,046 B2 5/2016 Dowty
2003/0164422 A1* 9/2003 Collet .................... B64C 25/26 244/102 R
2011/0024557 A1 2/2011 Brighton
2013/0075527 A1 3/2013 Lecourtier et al.
2013/0264418 A1 10/2013 Frank
2015/0151832 A1 6/2015 Filho
2018/0370616 A1 12/2018 Howell
2019/0185148 A1* 6/2019 Flinton .................. B64C 25/28

FOREIGN PATENT DOCUMENTS

DE 10 2016 007362 A1 12/2017
EP 3609781 B1 8/2022
GB 2562027 A 11/2018

OTHER PUBLICATIONS

EP Search Report for Application 23214696.9-1004, dated May 15, 2024, eleven pages.
Combined Search and Examination Report for GB2219149.8 dated Jun. 16, 2023, 7 pages.

* cited by examiner

*Primary Examiner* — Donald J Wallace
(74) *Attorney, Agent, or Firm* — Nixon & Vanderhye, PC

(57) ABSTRACT

A method of extending a landing gear of an aircraft is disclosed. The aircraft includes an uplock arranged to retain the landing gear in a retracted position, a primary landing gear system configured to retract and extend the landing gear, and an alternate landing gear system, independent from the primary landing gear system. The method includes the primary landing gear system holding the landing gear in place while the uplock is moved from a first configuration to a second configuration by the alternate landing gear system.

15 Claims, 4 Drawing Sheets

LANDING GEAR SYSTEMS AND METHODS OF TESTING

CROSS RELATED APPLICATION

This application claims priority to United Kingdom Patent Application GB 2219149.8, filed Dec. 19, 2022, the entire contents of which is hereby incorporated by reference.

BACKGROUND OF THE INVENTION

The present invention is concerned with detecting faults in the alternate landing gear systems of aircraft landing gear. More particularly, but not exclusively, this invention concerns a method of extending a landing gear of an aircraft. The invention also concerns a method of testing an alternate landing gear system and an aircraft configured to carry out the claimed methods.

Typically, aircraft are provided with a primary landing gear system for extending and retracting the landing gear during normal operations, and an alternate (backup) landing gear system that can release the landing gear in the case that the primary landing gear system fails. Typically, alternate landing gear systems are configured to release an uplock that is holding the landing gear in a retracted or stowed position so that the landing gear can then extend under its own weight due to gravity.

In order to ensure the necessary redundancy, the primary landing gear system and the alternate landing gear system are independent of each other, such that one of said systems can function when the other fails. For the or each uplock, each of the primary and alternate system comprises at least one actuator that can move the uplock between a closed position (in which the uplock constrains movement of the landing gear) and an open position (in which the uplock does not constrain movement of the landing gear). An uplock may include a hook that constrains the landing gear. Thus, each of the primary and alternate systems may comprise an actuator that can move the hook from a closed position to an open position. When in the closed position, the uplock may be in a locked configuration (in which the uplock cannot be opened, for example the hook cannot be moved) and an unlocked position (in which the uplock can be opened, for example the hook can be moved). An uplock may comprise a latch that is configured to move between a locked position (in which it holds the hood in a closed position) and an unlocked position (in which the latch does not constrain movement of the hook). As part of moving the uplock between the closed position and the open position, each of the primary and alternate system may be configured to unlock the uplock, for example by moving the latch from the locked position to the unlocked position. For example, each of the primary and alternate systems may comprise an actuator (which may be the same actuator used to move the hook, or a different actuator) that can move the latch from a locked position to an unlocked position. Thus, if the primary system is unable to operate its actuator(s) to open the uplock, the alternate system can still operate its actuator(s) to open the uplock and release the landing gear. The primary and alternatively landing gear systems also each comprise a separate supply of hydraulic and/or electric power, such that a power failure in one system does not prevent operation of the other system.

Given that the alternate landing gear system is only used in the case that the primary landing gear system fails it is important that the alternate landing gear system is regularly tested in order to ensure that any issues with the alternate landing gear system are promptly detected. Currently, that testing is carried out while the aircraft is on the ground, as part of a regular maintenance routine.

It would be advantageous to increase the efficiency with which testing of the alternate landing gear system is carried out and/or increase the likelihood of detecting any fault with the alternate landing gear system promptly. Alternatively or additionally, the present invention seeks to provide a method and/or apparatus for detecting failures in an alternate landing gear system.

SUMMARY OF THE INVENTION

According to a first aspect there is provided a method of extending a landing gear of an aircraft, the aircraft comprising: one or more uplocks arranged to retain the landing gear in a retracted position; a primary landing gear system configured to retract and extend the landing gear, and an alternate landing gear system. The alternate landing gear system may be independent from the primary landing gear system. The method comprises the primary landing gear system holding the landing gear in place while the uplock (for example the or each uplock) is moved from a first configuration to a second configuration by the alternate landing gear system.

Thus, methods in accordance with the present invention may use the alternate landing gear system to unlock and/or open an uplock while the landing gear is held in position by the primary landing gear system. This may allow the correct functioning of the alternate system to be confirmed. Advantageously, this allows for the faster identification and/or elimination of dormant failures without the need for additional hardware and/or maintenance procedures. Additionally or alternatively, this may reduce and/or eliminate the need to check the status of the alternate landing gear system on the ground, thereby simplifying maintenance procedures and/or reducing turn-around times. Holding the landing gear using the primary system while the alternate system is tested allows the primary system to subsequently extend the landing gear in a controlled manner (as opposed to the landing gear dropping under gravity), which may reduce loads and/or fatigue on the landing gear. Holding the landing gear in place using the primary landing gear system may comprise preventing the landing gear from falling under its own weight. The method may comprise the primary landing gear system holding the landing gear in place such that dropping of the landing gear under gravity is prevented. Alternatively or additionally, holding the landing gear in place using the primary landing gear system may comprise holding the landing gear within the aircraft, for example within the body of the aircraft.

The first configuration may be a closed and locked configuration in which the uplock is locked in a closed position which constrains movement of the landing gear. The second configuration may be an unlocked and closed configuration (in which the uplock is in the closed position but unlocked) and/or an open configuration (in which the uplock does not constrain movement of the landing gear).

The primary landing gear system and the alternate landing gear system may each comprise an actuator arranged to move the same uplock between the first configuration and the second configuration. It may be that the primary landing gear system comprises a connection to a first, main, supply of electric and/or hydraulic power. For example, a connection to the main electrical and/or hydraulic systems of the aircraft. Alternatively, the primary landing gear system may comprise one or more main power packs, each main power pack being a supply of hydraulic and/or electric power. The or each power pack and/or connection may be connected to the or each actuator of the primary landing gear system to provide hydraulic and/or electric power thereto. It may be that the alternate landing gear system comprises one or more alternate power packs, each alternate power pack being a supply of hydraulic and/or electric power. The or each alternate power pack may be connected to the or each actuator of the alternate landing gear system to provide hydraulic and/or electric power thereto.

The method may comprise the step of monitoring the status of the alternate landing gear system using monitoring equipment and providing an indication of the status of the alternate landing gear system.

The method may comprise a monitoring system determining the status of the uplock while the primary landing gear system is holding the landing gear. For example the monitoring system may comprise one or more sensors arranged to detect that the uplock is the first configuration and/or the second configuration, for example that the uplock is unlocked and/or in an open position. The method may comprise the monitoring system determining the configuration of the uplock in dependence on the signal received from said one or more sensors. The method may comprise the monitoring system providing (or being configured to provide) an indication to a control system of the aircraft and/or to a user in the case that the alternate landing gear system has successfully moved the uplock away from the first configuration to the second configuration. The method may comprise the monitoring system providing (or being configured to provide) an indication to the control system and/or to the user in the case that the alternate landing gear system fails to move the uplock away from the first configuration and/or to the second configuration. Said one or more sensors may comprise electrical sensors, optical sensors and/or any other sensor which would be apparent to the skilled person as being suitable.

The method may comprise the primary landing gear system holding the landing gear in place while the uplock is returned to the first configuration from the second configuration by the alternate landing gear system. Thus, the alternate landing gear system may be used to return the or each uplock to its original configuration. The method may comprise the primary landing gear system then moving the uplock from the first configuration to an open configuration (which may be the second configuration or a third configuration if the second configuration was a closed and unlocked configuration). It may be that the primary landing gear system then releases the landing gear and/or extends the landing gear. Using the alternate landing gear system to revert the uplock to the first configuration may allow the primary landing gear system to then perform the complete extension sequence (e.g. including the step of moving the uplock) such that no components of the primary landing gear system lie dormant for a flight cycle. This may be advantageous for ensuring the reliable operation of the primary landing gear system and/or reducing the risk of a fault in the primary system.

Alternatively, the uplock may be moved from the second configuration to the first configuration by the primary landing gear system. This reverts the uplock to the first configuration, which is the same configuration it was in before the alternate landing gear system was used. This may reduce the time taken to test the alternate system while still using all components of both the alternate and primary systems.

Alternatively, it may be that once the alternate landing gear system has moved the uplock to the second configuration, the primary landing gear system then releases the landing gear and/or extends the landing gear. Thus, it may be that the uplock is not returned to the first configuration until after the landing gear has been extended. This may reduce the time taken for the landing gear extension sequence whilst still allowing the alternate landing gear system to be tested.

The method may comprise the primary landing gear system moving the landing gear within the body of the aircraft (for example from the retracted or stowed position) to a lifted position in which the weight of the landing gear upon the uplock is reduced and/or removed (in comparison to the retracted or stowed position in which the landing gear rests on the uplock(s)). It may be that the primary landing gear system then holds the landing gear in the lifted position while the alternate landing gear system moves the uplock between the first and second configurations. Reducing or removing the weight of the landing gear from the uplock during movement of the uplock may reduce loads and/or fatigue of the uplock, thereby increasing the life of the uplock. Alternatively, it may be that the primary landing gear system holds the landing gear in the retracted or stowed position while the alternate landing gear system moves the uplock between the first and second configurations.

The aircraft may comprise one or more landing gear doors which close off a landing gear bay in which the landing gear is located when stowed. The method may comprise a step of opening the landing gear doors, in which the landing gear doors are moved from a closed position to an open position in which the landing gear bay is accessible from the exterior of the aircraft. This step may be carried out after the uplock is moved from the first configuration to the second configuration by the alternate system (and optionally after the uplock is returned from the second configuration to the first configuration). In this way, the alternate system can be tested without impacting on the length of time the landing gear doors are open (which may be advantageous given the aerodynamic and noise impacts of having the doors open). It may be that the primary landing gear system operates the or each landing gear door lock to unlock the landing gear doors. It may be that the doors are then allowed to fall open under gravity. Alternatively, it may be that the primary system then moves the doors to from the closed position to the open position. The method may comprise the primary landing gear system moving the landing gear doors to a lifted position in which the weight of the door on the landing gear door locks is reduced and/or removed. The step of moving the landing gear doors may be carried out before and/or at the same time as the step of the primary landing gear system moving the landing gear to the lifted position.

The method may comprise the primary landing gear system moving the uplock from the first configuration to an open configuration (which may be the second configuration or a further different configuration) once the landing gear doors are open.

After the landing gear has extended, the method may comprise the landing gear being locked in the extended configuration, for example by the primary landing gear system. The method may then comprise the primary landing gear system closing the landing gear doors and/or locking the landing gear door locks.

The landing gear may comprise a landing gear leg, for example mounted at one end to the aircraft and having one or more wheels at the other end. The landing gear may take any conventional form.

The primary landing gear system may be configured to extend and retract the landing gear, for example in normal use. The primary landing gear system may be configured to move the uplock between the first configuration and an open configuration. The primary landing gear system may comprise at least one actuator arranged to move the or each uplock between the first configuration and an open configuration. The primary landing gear system may comprise at a main actuator configured to move the landing gear between the extended and retracted positions and, optionally, between the retracted and lifted positions. The primary landing gear system may also be connected to one or more of the landing gear doors and the landing gear door locks. The primary landing gear system may comprise one or more actuators configured to move the landing gear doors or the landing gear door locks. The primary landing gear system may comprise one or more hydraulic lines or electric connections to connect the hydraulic and/or electric supply or power packs discussed above with the actuator(s) of the primary landing gear system.

The alternate landing gear system may be configured to move the or each uplock from the first configuration to an open configuration independently of the status of the primary landing gear system. The alternate landing gear system may comprise at least one actuator configured to move an uplock between the first configuration and an open configuration. The alternate landing gear system may comprise at least one actuator configured to move an uplock between the first configuration and the second configuration The alternate landing gear system may comprise one or more hydraulic lines or electric connections to connect the alternate power pack discussed above to the actuator and valves (if present) of the alternate landing gear system. As used herein, the alternate landing gear system being independent from the primary landing gear system may be defined as requiring that the alternate landing gear system comprises at least one actuator and a supply of hydraulic and/or electric power (as appropriate) that is separate from the supply of hydraulic and/or electric power for the primary system. The supply of the alternate system being connected to the actuator of the alternate system to move the actuator.

The alternate landing gear system may comprise at least one isolation valve, positioned on a hydraulic line of the primary landing gear system so that closure of the isolation valve isolates the primary landing gear system from the rest of the hydraulic systems of the aircraft and/or the hydraulic supply.

The alternate landing gear system may comprise at least one vent valve, positioned on a hydraulic line of the primary landing gear system so that opening the vent valve reduces the hydraulic pressure in the primary landing gear system, for example by connecting the hydraulics of the primary landing gear system to tank or return.

In the event of a failure of the primary landing gear system, the isolation valve(s) and vent valve(s) are operated by the alternate system to reduce hydraulic pressure in the primary landing gear system so that pressure in the primary system does not inhibit movement of the landing gear. The method may comprise the alternate system operating the isolation valve(s) and/or vent valve(s). The monitoring system may also comprise one or more sensors arranged to detect the position of the or each isolation valve and/or vent valve of the alternate landing gear system. The method may comprise the monitoring system determining the position of the valve(s) in dependence on the signal received from said one or more sensors. The method may comprise the monitoring system providing (or being configured to provide) an indication to a control system of the aircraft and/or to a user in the case that the alternate landing gear system fails to move the isolation valve(s) to an closed position and/or the vent valve(s) to an open position. The method may comprise the alternate system moving the isolation valve(s) to the closed position and/or the vent valve(s) to an open position for less than ten seconds, for example for less than one second, and then returning the isolation valve(s) to an open position (in which fluid can flow from the hydraulic supply to the primary system) and/or the vent valve(s) to a closed position (in which fluid is retained in the primary system). The monitoring system may comprise one or more processors and software installed thereon for carrying out said steps of determining a position and/or providing an indication as described above.

The method may be carried out while the aircraft is in flight, for example when the aircraft is on approach.

The method may be carried out periodically, for example after a predetermined number of landings of the aircraft, for example at least once per 200 landings, for example at least once per 50 landings, for example during every landing. Alternatively, the method may be carried out periodically, for example after a predetermined time interval, for example at least once a month, for example at least once a week.

Uplocks are well known to the skilled person and will not be described further herein. EP 3 609 781 B1 (Airbus Operations Limited), the entirety of which is incorporated herein by reference, discuses uplocks and discloses example uplocks suitable for use with the present invention.

According to a second aspect there is provided a method of testing a landing gear system in an aircraft, the aircraft comprising: an uplock arranged to retain the landing gear in a retracted position; a primary landing gear system configured to extend and retract the landing gear, and an alternate landing gear system, independent of the primary landing gear system. The method comprises the alternate landing gear system moving the uplock (for example the or each uplock) from a first configuration to a second configuration while the landing gear is extended and the aircraft is on the ground. The method of the second aspect may be carried out in addition to or instead of the method of the first aspect. The method may comprise a user visually observing if the uplock has moved, in order to determine whether the alternate system is functioning. Methods in accordance with the second aspect may allow testing of the alternate landing gear system to be carried out without any additional hardware.

The aircraft may comprise a monitoring system as discussed above in connection with the first aspect. The method may comprise, while the landing gear is extended and the aircraft is on the ground, the monitoring system determining whether the uplock is in the first configuration and/or the second configuration in dependence on the signal from the sensor. The method may comprise the monitoring system providing an indication to a control system of the aircraft and/or to a user in the case that uplock is not moved from the first configuration and/or the second configuration by the alternate system.

It may be that the method comprises the alternate landing gear system returning the uplock to the first configuration from the second configuration. Thus, the alternate system may be used to return the uplock to the original configuration.

According to a fourth aspect there is provided an aircraft comprising a landing gear, the aircraft comprising: a primary landing gear system configured to retract and extend the landing gear; an alternate landing gear system, independent of the primary landing gear system; and a control system configured to operate the primary landing gear system and the alternate landing gear system to perform the method of any preceding claim. The control system may be configured to receive one or more inputs from a user, for example a pilot. The or each control system may comprise one or more processors having software thereon that when executed operates the primary landing gear system and the alternate landing gear system to perform the method. The or each control system may comprise hardware or a conventional type that allows signals from the processor(s) to control the operation of the primary and alternate landing gear systems. The control system may comprise a primary control system for operating the primarily landing gear system, and an alternate control system, independent from the primary control system, to control operation of the alternate landing gear system in the case the primary landing gear system and/or primary control system fails. The aircraft may have any of the features described above in connection with the method of the first or second aspects.

The aircraft may be a commercial aircraft, suitable for configuration as a commercial passenger aircraft. The passenger aircraft may a cabin capable of being configured to accommodate at least 50, for example at least 100 passengers. The aircraft may be a commercial aircraft, for example a commercial passenger aircraft, for example a single aisle or twin aisle aircraft.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
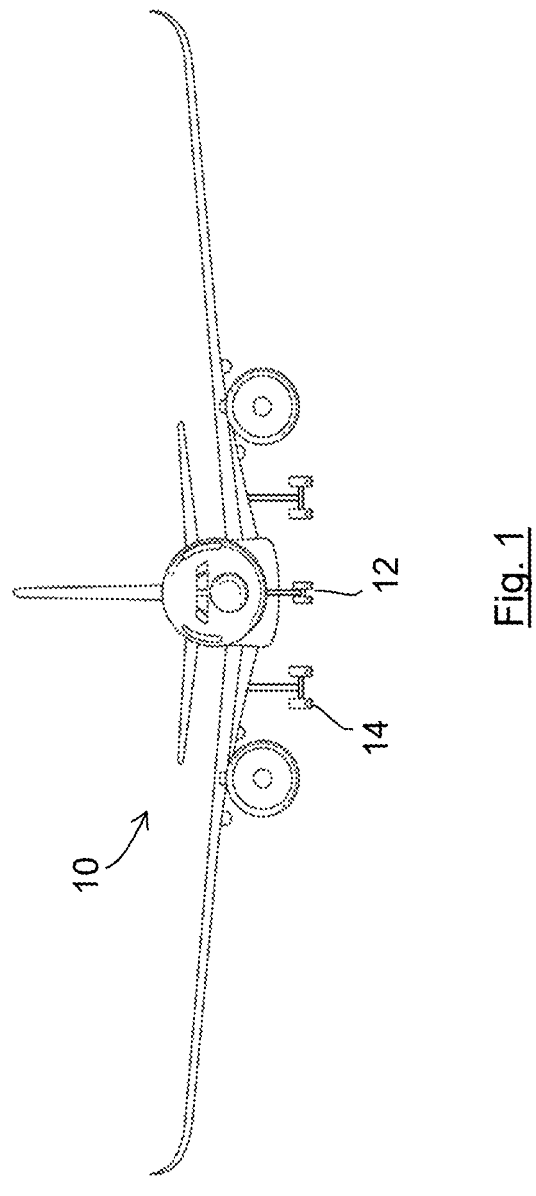
FIG. 1 shows a front view of an aircraft.

FIG. 1 shows a front view of an aircraft 10. The aircraft has a nose landing gear 12 and a main landing gear 14, both of which may be a landing gear as described in FIG. 2 below. The aircraft 10 is shown with the nose landing gear 12 and the main landing gear 14 in the extended position. The nose landing gear 12 and the main landing gear 14 can be retracted to a stowed position within the body of the aircraft 10.

Figure 2:
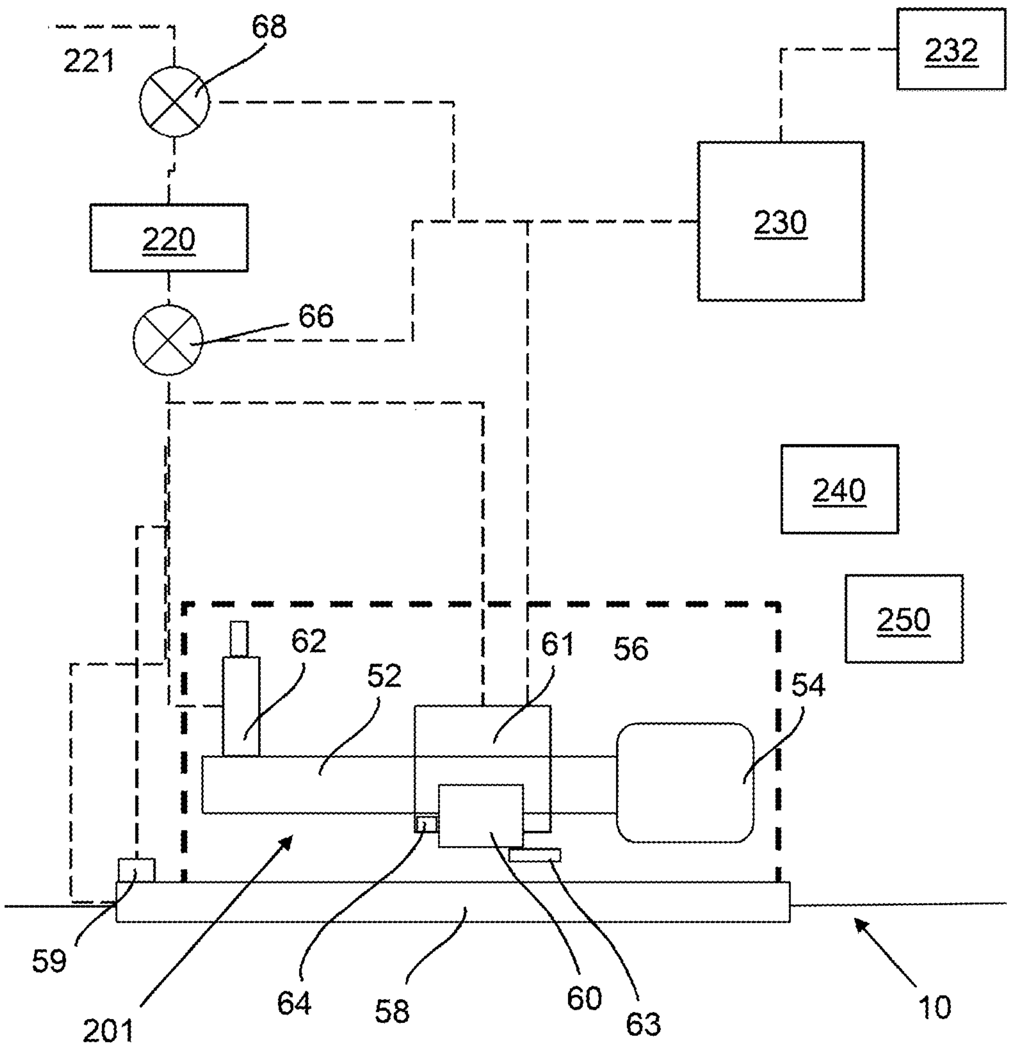
FIG. 2 shows a schematic view of a landing gear according to a first example embodiment.

FIG. 2 shows a landing gear 201 comprising a landing gear leg 52 mounted at one end to the aircraft 10 and having a wheel 54 at the other end. In the retracted or stowed position as shown in FIG. 2 the landing gear leg 52 is located within a landing gear bay 56 (indicated by a dashed line in FIG. 2) within the aircraft 10, the entrance to which is closed off by a landing gear door 58, which is held in place by a landing gear door lock 59. The landing gear leg 52 is held in the retracted or stowed position by the hook 60 of an uplock 61, such uplocks being of a conventional type known to a skilled person. The uplock includes a latch 63 configured to lock the hook 60 in a closed position (as shown in FIG. 2) in which the hook 60 constrains the landing gear 201. The uplock comprises a sensor 64 configured to determine when the latch 63 is in the locked position (as shown in FIG. 2). The sensor 64 determines the status of the uplock by detecting when a target (not shown) on the latch 63 is adjacent the sensor. It will be appreciated that other conventional types of sensor and sensor arrangements could be used. A main actuator 62 is connected to the landing gear leg 52 at one end, and the aircraft 10 at the other. For the sake of clarity conventional details of the construction of the landing gear are omitted here. The uplock 61, main actuator 62, landing gear door 58 and landing gear door lock 59 are hydraulically connected as part of a primary landing gear system 220 with dashed lines schematically representing the hydraulic connections in FIG. 2. The primary landing gear system 220 also comprises a connection 221 to a source of pressurised fluid, for example the main hydraulic system (not shown) of the aircraft. In other embodiments a mechanical or electrical connection may be used in addition to or instead of the hydraulic connection. The uplock 61 is also electrically connected to an alternate landing gear system 230 with dashed lines schematically representing the electrical connections in FIG. 2. In other embodiments these may be mechanical or hydraulic connections. The alternate landing gear system 230 comprises an auxiliary power source 232 which supplies electrical power. The alternate landing gear system is also electrically connected to and comprises an isolation valve 68 located on a hydraulic line of the primary landing gear system 220 and a vent valve 66 located on a hydraulic line of the primary landing gear system 220. The aircraft further comprises a monitoring system 240. The monitoring system 240 is connected (for clarity the connections are not shown in FIG. 2) to the sensor 64 as well as other sensors (not shown) arranged to detect the position of the isolation valve 64 and vent valve 66 and the position of landing gear door 58 and landing gear door lock 59. The monitoring system 240 comprises one or more processors and other conventional signal processing hardware and software configured to process the signals received from the sensors, including sensor 64, and to provide alerts to a control system 250 of the aircraft and/or a user as discussed below in the context of the method. Control system 250 comprises one or more processors and other conventional signal processing hardware and software configured to control the aircraft in response to one or more user inputs, and to provide information to a user, for example through visual or audible signals. Control system 250 is also configured to control the primary landing gear system 220 and the alternate landing gear system 230 (for example via a primary control system and an alternate control system) in order to extend and retract the landing gear, and to carry out the method of FIG. 3 and/or FIG. 4.

Figure 3:
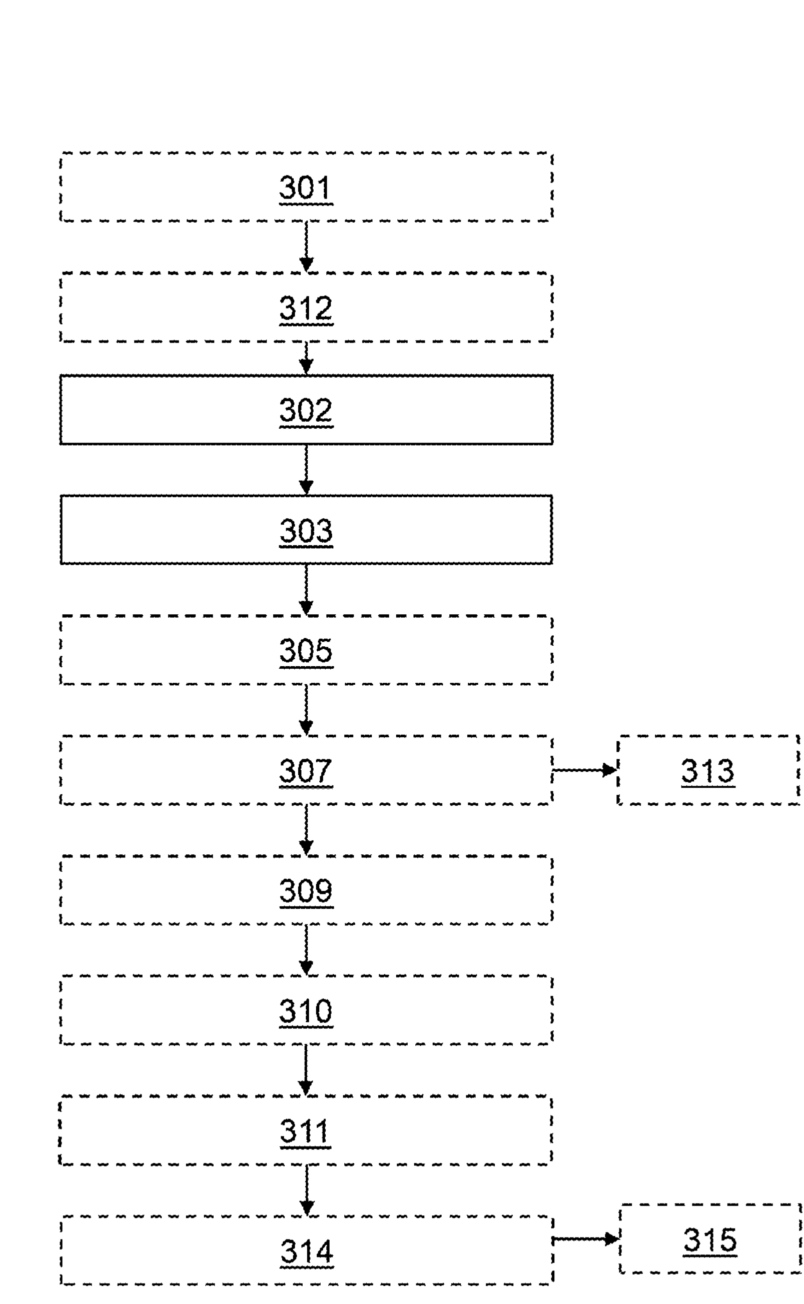
FIG. 3 shows a flow chart of a first example method in accordance with the present invention.

FIG. 3 shows a block diagram depicting an example method 300 in accordance with the present invention. Optional features are shown with a dashed line box in FIG. 3. The method comprises a user or control system 250 of the aircraft initiating 301 the landing gear extension sequence. The primary landing gear system 230 holds 302 the landing gear in place, while the alternate landing gear system 240 moves 303 the uplock 61, and more particularly the latch 63, from a closed and locked configuration in which the latch 63 looks the hook 60 in a closed position in which it constrains the landing gear (as shown in FIG. 2) to an unlocked and closed configuration in which the latch is in an unlocked position while the hook remains in the closed position. In other embodiments, the alternate landing gear system 240 may move the uplock 61, and more particularly the hook 60, to an open position in which the hook does not constrain the landing gear. Optionally, the primary landing gear system lifts 312 the landing gear to a lifted position in which the weight of the landing gear on the uplock is reduced, and then holds 302 the landing gear in that lifted position while the uplock is moved 303. Alternatively, the primary landing gear system may simply hold 302 the landing gear in the normal stowed position. In either scenario, the landing gear is not allowed to fall under its own weight because the primary landing gear system holds it in place. Accordingly, methods in accordance with the present example may allow the functioning of the alternate system to be checked while the aircraft is in flight and/or without subjecting the landing gear to the high loads experienced when it drops into the extended position under the action of gravity alone.

The sensor 64 provides a signal to the monitoring system 260. The monitoring system 260 processes 305 that signal to determine the position of the latch 63, and in the event that the latch 63 has remained in the locked position sends 313 a signal to the control system to alert the control system that the alternate landing gear system 240 has failed to function. In other embodiments, the monitoring system and control system may be combined and/or different functions may be carried out by different ones of the control and monitoring system. Provided the alternate landing gear system 230 has successfully moved 303 the latch 63, then the alternate landing gear system 230 returns 309 the uplock to the closed and locked configuration. In other embodiments, the primary landing gear system 220 may be used to return the uplock to the closed and locked configuration. The primary landing gear system then carries out the following steps in sequence to complete 309 the extension sequence of the landing gear:

unlocking the landing gear doors by actuating the landing gear door looks;
opening the landing gear doors;
unlocking and opening the landing gear uplocks
extending the landing gear;
locking the landing gear in the extended position;
closing the landing gear doors; and
locking the landing gear doors.

In other embodiments one or more of the above steps may be absent, or the steps may be carried out in a different order. In some embodiments, the primary landing gear system 300 lifts the landing gear doors to unload the landing gear door locks before they are opened.

After the extension sequence is completed 309, the alternate landing gear system 230 briefly closes 310 the isolation valve 68 and opens 311 the vent valve 66. The isolation valve 68 is closed 310 and the vent valve 66 opened 311 for a period of less than 1 second, so that pressure loss in the primary landing gear system is minimised while still allowing the functionality of the alternate landing gear system to be fully tested. The monitoring system 260 processes 314 signals from the sensors associated with the isolation valve and the vent valve to determine the position of the valves, and in the event that isolation valve has not closed and/or the vent valve has not opened sends 315 a signal to the control system to alert the control system that the alternate landing gear system 240 has failed to function.

The method 300 is performed whilst the aircraft is in flight, for example on approach to an airport. The method 300 requires additional time to complete the additional steps 302, 303, 305, 307 and so the landing gear extension sequence may begin earlier in the approach procedure of the aircraft than previously. The method is carried out periodically, for example once per 50 flight cycles, and can be initiated by a pilot or it can be automatically incorporated into the approach sequence of the aircraft by an onboard processor.

Figure 4:
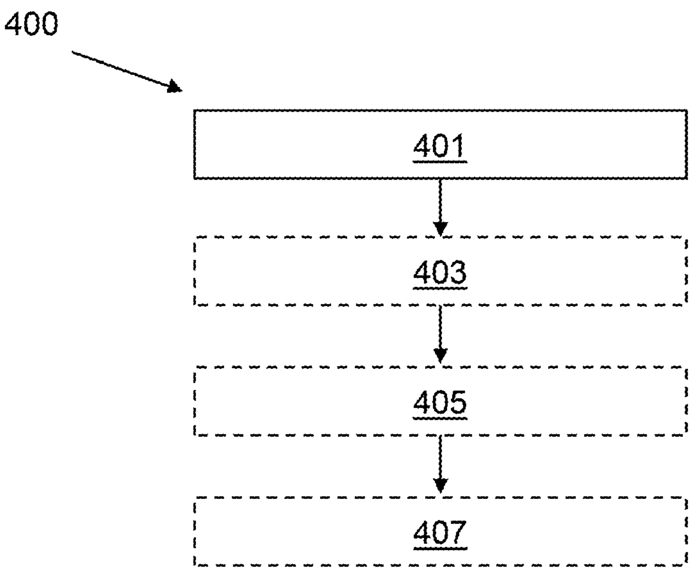
FIG. 4 shows a flow chart of a second example method in accordance with the present invention.

FIG. 4 shows a block diagram depicting an example method 400 of testing the landing gear system when the aircraft is on the ground. Optional features are shown in dashed lines. The method 400 comprises using the alternate landing gear system 230 to move 401 the uplock 60 from the closed configuration to the open configuration while the landing gear is extended and the aircraft is on the ground. The position of the uplock 60 is monitored 403 as discussed above in connection with the method 300 and an indication of the status of the alternate landing gear system can therefore be given 405 by the monitoring system 240 to the control system 250 or a user. Optionally, the uplock 60 is then returned 407 to the closed configuration by the alternate landing gear system 230.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of extending a landing gear of an aircraft, the aircraft comprising:

an uplock arranged to retain the landing gear in a retracted position,
a primary landing gear system having a main actuator configured to retract and extend the landing gear, and
an alternate landing gear system, independent from the primary landing gear system,
wherein the alternate landing gear system comprises an actuator arranged to move the uplock between a first configuration and a second configuration,
wherein the method comprises the main actuator of the primary landing gear system holding the landing gear in place while the uplock is moved from the first configuration to the second configuration by the actuator of the alternate landing gear system.

2. The method according to claim 1, wherein the aircraft has a monitoring system comprising one or more sensors arranged to detect whether the uplock is in the first and/or second configuration, the method comprises the monitoring system determining the configuration of the uplock in dependence on a signal received from said one or more sensors, and the monitoring system is configured to provide an indication to a control system of the aircraft and/or to a user in the case that the alternate landing gear system fails to move the uplock from the first configuration to the second configuration.

3. The method according to claim 2, wherein the alternate landing gear system comprises at least one isolation valve, positioned on a hydraulic line of the primary landing gear system so that closure of the isolation valve isolates the primary landing gear system from the rest of the hydraulic systems of the aircraft and/or the hydraulic supply, and the method comprises the alternate landing gear system moving the isolation valve(s) to a closed position, and then, optionally, the alternate landing gear system returning the isolation valve(s) to an open position.

4. The method according to claim 3, wherein the monitoring system also comprises one or more sensors arranged to detect the position of the or each isolation valve and/or vent valve of the alternate landing gear system, and the method comprises the monitoring system determining the position of the valve(s) in dependence on the signal received from said one or more sensors and the monitoring system being configured to provide an indication to a control system of the aircraft and/or to a user in the case that the alternate landing gear system fails to move the isolation valve(s) to an closed position and/or the vent valve(s) to an open position.

5. The method according to claim 1, wherein the first configuration is a locked and closed configuration and the second configuration is an unlocked and closed configuration or an open configuration.

6. The method according to claim 1, wherein the primary landing gear system continues to hold the landing gear in place while the uplock is returned to the first configuration from the second configuration by the alternate landing gear system.

7. The method according to claim 1, further comprising the primary landing gear system moving the landing gear within a body of the aircraft to a lifted position in which weight of the landing gear upon the uplock is reduced and/or removed, and the primary landing gear system then holds the landing gear in the lifted position while the alternate landing gear system moves the uplock between the first configuration and the second configuration.

8. The method according to claim 1, wherein a step of opening one or more landing gear bay doors is carried out after the uplock is moved from the first configuration to the second configuration by the alternate landing gear system.

9. The method according to claim 1, wherein the method is carried out while the aircraft is in the air.

10. The method according to claim 1, wherein the alternate landing gear system comprises at least one vent valve, positioned on a hydraulic line of the primary landing gear system so that opening the vent valve reduces the hydraulic pressure in the primary landing gear system by connecting the hydraulics of the primary landing gear system to tank or return, and the method comprises the alternate landing gear system moving the vent valve(s) to an open position, and then, optionally, the alternate landing gear system returning the vent valve(s) to a closed position.

11. The method according to claim 10, wherein the method comprises the alternate landing gear system moving the isolation valve(s) to the closed position and/or the vent valve(s) to an open position for less than ten seconds, for example for less than one second, and then returning the isolation valve(s) to an open position and/or the vent valve(s) to a closed position.

12. The method of claim 1, wherein the step of the primary landing gear system holding the landing gear in place while the uplock is moved from a first configuration to a second configuration by the alternate landing gear system is carried out periodically, for example at least once for every fifty landings.

13. A method of testing a landing gear system in an aircraft, the aircraft comprising:

an uplock arranged to retain the landing gear in a retracted position;

a primary landing gear system having a main actuator configured to extend and retract the landing gear; and an alternate landing gear system, independent of the primary landing gear system, wherein the alternate landing gear system comprises an actuator arranged to move the uplock between a first configuration and a second configuration, wherein the method comprises the alternate landing gear system moving the uplock from the first configuration to the second configuration while the landing gear is extended and the aircraft is on the ground.

14. The method of claim 13, wherein the method comprises the alternate landing gear system returning the uplock to the first configuration from the second configuration while the landing gear is extended and the aircraft is on the ground.

15. An aircraft comprising a landing gear, the aircraft comprising:

a primary landing gear system configured to retract and extend the landing gear;

an alternate landing gear system, independent of the primary landing gear system; and a control system configured to operate the primary landing gear system and the alternate landing gear system in order to perform the method of claim 1.

* * * * *